(12) United States Patent
O'Masta et al.

(10) Patent No.: US 12,371,386 B2
(45) Date of Patent: Jul. 29, 2025

(54) COMPRESSIBLE COATING REINFORCEMENTS FOR CERAMIC MATRIX COMPOSITES, AND METHODS OF MAKING THE SAME

(71) Applicant: HRL Laboratories, LLC, Malibu, CA (US)

(72) Inventors: Mark O'Masta, Oak Park, CA (US); Phuong Bui, Thousand Oaks, CA (US); Tobias Schaedler, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 18/243,141

(22) Filed: Sep. 7, 2023

(65) Prior Publication Data
US 2023/0416160 A1 Dec. 28, 2023

Related U.S. Application Data

(62) Division of application No. 17/520,154, filed on Nov. 5, 2021, now Pat. No. 11,787,746.
(Continued)

(51) Int. Cl.
*C04B 35/80* (2006.01)
*C04B 35/628* (2006.01)
*C04B 111/40* (2006.01)

(52) U.S. Cl.
CPC ............ *C04B 35/80* (2013.01); *C04B 35/628* (2013.01); *C04B 2111/40* (2013.01); *C04B 2235/5276* (2013.01)

(58) Field of Classification Search
CPC .................. C04B 35/80; C04B 35/628; C04B 2235/5276; C04B 2111/40
(Continued)

(56) References Cited

U.S. PATENT DOCUMENTS 3,869,335 A * 3/1975 Siefert ..................... C03C 10/16
65/444
4,642,271 A * 2/1987 Rice ........................ C04B 35/488
428/378

(Continued)

OTHER PUBLICATIONS

Finite Fiber, Carbon Fibers, 2023. (Year: 2023).*

*Primary Examiner* — Tae H Yoon
(74) *Attorney, Agent, or Firm* — O'Connor & Company; Ryan P. O'Connor

(57) ABSTRACT

Some variations provide a pre-ceramic matrix composite comprising: a precursor pre-ceramic matrix; reinforcing elements disposed within the precursor pre-ceramic matrix; and a compressible material disposed on the surface of the reinforcing elements and interposed between the reinforcing elements and the precursor pre-ceramic matrix. Other variations provide a ceramic matrix composite comprising: a ceramic matrix; reinforcing elements disposed within the ceramic matrix; and a compressed material disposed on the surface of the reinforcing elements and interposed between the reinforcing elements and the matrix. The coating of compressible material prevents cracking during processing because the coating absorbs stresses associated with volumetric shrinkage of the ceramic matrix during densification, thereby reducing the stresses at the interface between the reinforcing elements and the ceramic matrix. Methods of fabricating ceramic matrix composites using the principles of the invention are disclosed. Methods include pyrolysis of pre-ceramic polymers, sintering of pre-ceramic materials, and sol-gel processing.

11 Claims, 6 Drawing Sheets
(6 of 6 Drawing Sheet(s) Filed in Color)

Related U.S. Application Data

(60) Provisional application No. 63/148,041, filed on Feb. 10, 2021.

(58) Field of Classification Search
USPC .......................................................... 501/95.2
See application file for complete search history.

(56) References Cited

U.S. PATENT DOCUMENTS

| | | | | |
|---|---|---|---|---|
| 4,869,943 | A * | 9/1989 | Corbin | C04B 35/591 |
| | | | | 501/97.4 |
| 5,039,635 | A * | 8/1991 | Stempin | C04B 35/80 |
| | | | | 501/89 |
| 5,480,707 | A * | 1/1996 | Steffier | C04B 35/80 |
| | | | | 87/8 |
| 6,251,317 | B1 * | 6/2001 | Lundberg | C04B 35/62894 |
| | | | | 264/642 |
| 2002/0179225 | A1 * | 12/2002 | Behr | C04B 35/573 |
| | | | | 156/89.13 |
| 2005/0276961 | A1 * | 12/2005 | Sherwood | C04B 35/571 |
| | | | | 428/292.1 |
| 2017/0342549 | A1 * | 11/2017 | Kashyap | C04B 35/571 |

\* cited by examiner

COMPRESSIBLE COATING REINFORCEMENTS FOR CERAMIC MATRIX COMPOSITES, AND METHODS OF MAKING THE SAME

PRIORITY DATA

This patent application is a divisional application of U.S. patent application Ser. No. 17/520,154, filed on Nov. 5, 2021, now U.S. Pat. No. 11,787,746, which claims priority to U.S. Provisional Patent App. No. 63/148,041, filed on Feb. 10, 2021, each of which is hereby incorporated by reference herein.

FIELD OF THE INVENTION

The present invention generally relates to ceramic matrix compositions, and methods for making and using ceramic matrix compositions.

BACKGROUND OF THE INVENTION

There is commercial demand for ceramics in many fields including industrial filtration (e.g., molten metal filters and flow separators), metal processing (e.g., casting molds/blanks), semiconductor processing, jet engines, propulsion components, hypersonics, thermal protection systems, porous burners, microelectromechanical systems, and electronic device packaging, for example.

In comparison with metals and polymers, ceramics are difficult to process, particularly into complex shapes. Because they cannot be cast or machined easily, ceramics are typically consolidated from powders by sintering or deposited in thin films. Flaws, such as porosity and inhomogeneity introduced during processing, govern the strength because the flaws initiate cracks, and—in contrast to metals—brittle ceramics have little ability to resist fracture. This processing challenge has limited the ability to take advantage of ceramics' impressive properties, including high-temperature capability, environmental resistance, and high strength.

Ceramic matrix composite (CMC) materials overcome many disadvantages of conventional ceramics, such as brittle failure, low fracture toughness, and limited thermal shock resistance. Applications of ceramic matrix composites include those requiring reliability at high temperatures (beyond the capability of metals or polymers) and resistance to corrosion and wear. Ceramic matrix composites may include reinforcements such as toughening aids, to enhance toughness. Reinforcements can also be added to control other properties, including, but not limited to, elastic modulus, coefficient of thermal expansion, strength, electromagnetic wave dispersion, magnetic interactions, and refractive index. Many civil and military applications require structural integrity within thermally, mechanically and chemically challenging environments.

Ceramics benefit from toughening aids because the ceramics inherently are prone to brittle, catastrophic failure due to their high Peierls-Nabarro resistance and low number of slip systems, which both limit plastic deformation. Polycrystalline technical ceramics have a mode I fracture toughness of less than 5 MPa·m$^{1/2}$, with amorphous glasses reaching only about 1 MPa·m$^{1/2}$. For comparison, the toughness of metals is typically in excess of 10 MPa·m$^{1/2}$, with some steels and Ni and Ti alloys reaching at least 100 MPa·m$^{1/2}$. As such, ceramics are defect-sensitive. Ceramic fracture is understood to originate at flaws, which are distributed within the volume of the component or on its surfaces. Typical machined ceramic has a surface flaw size of 10-50 μm.

Ceramic strength is limited by the most deleterious defect within the ceramic body, conceptualized by the weakest-link theory. See Takeo et al, "Finite Element Analysis of the Size Effect on Ceramic Strength", *Materials* 12 (2019) 2885, which is incorporated by reference.

Reinforcing ceramics with particles can cause geometric shielding, in which the particles force a crack to take a more tortuous path and hence increase the energy required for crack propagation. Short fibers, in addition to geometric shielding, can remain intact behind a passing crack, proving a "bridge" that closes the crack. SiC composites containing short alumina fibers increase the toughness by more than 6 MPa·m$^{1/2}$ over the matrix (SiC) material, while also substantially reducing strength variability (3×increase in Weibull modulus). See Becher et al., "Toughening Behavior in Whisker-Reinforced Ceramic Matrix Composites", *J. Am. Ceram. Soc.* 71 (1988) 1050-1061, which is incorporated by reference. Long-fiber ceramic-matrix composites (CMCs), such as silicon carbide/silicon carbide (SiC/SiC) have reached over 30 MPa·m$^{1/2}$ in toughness. See Evans, "Perspective on the Development of High-Toughness Ceramics", *J. Am. Ceram. Soc.* 73 (1990) 187-206, which is incorporated by reference. Long fibers are additionally of interest as they can lead to so-called rising R-curve behavior, where the material becomes tougher as a crack grows.

A primary interest in reinforcing ceramics is that reinforcement considerably increases the composite toughness and damage tolerance over either the matrix material or the reinforcement material alone. Toughening potency depends upon geometric form factor, increasing from particles to short fibers to long fibers. Toughening potency also depends on particle size, with the literature showing toughness of fibers increasing with the square root of the fiber diameter. See Wachtman et al., *Mechanical Properties of Ceramics*, Second Edition, Hoboken, NJ, USA: John Wiley & Sons, Inc. (2009), which is incorporated by reference. Therefore, large and high-aspect-ratio reinforcements are most desirable.

The problem is that the same geometric properties that promote toughening can cause a ceramic matrix to crack. This dichotomy is especially true for processing methods in which the matrix undergoes volumetric shrinkage. For instance, pre-ceramic polymers are directly converted to a dense matrix through a high-temperature pyrolysis process. However, during this conversion, the material can shrink from 10% to 40% by volume, depending upon the chemistry. Since the reinforcement does not typically shrink as does the matrix, significant matrix cracking can result from the large tensile stresses at the interface. Flaws originating during processing are unacceptable as the flaws can weaken the ceramic then cause catastrophic failure in operation.

Coatings have been previously used with ceramic matrix composites. Coating technologies have included dispersion aids, tailored surface chemistry for bonding, environmental barrier coatings, and schemes for matrix/reinforcement interphase weakening.

Dispersion aids are described in U.S. Pat. No. 5,993,967 to Brotzman et al., which is incorporated by reference. This patent discloses a siloxane star-graft polymer coating to encapsulate ceramic particles, thereby enabling the dispersion of such particles in oils, polymers and water. For examples of tailored surface chemistry for bonding, see Garcia-Tunon et al., "Designing smart particles for the assembly of complex macroscopic structures", *Angew Chem*

*Int Ed Engl.* 52(30), 7805-7808 (2013), and Song et al., "Optimization and characterization of high-viscosity $ZrO_2$ ceramic nanocomposite resins for supportless stereolithography", Materials and Design 180 (2019), 107960, each of which is incorporated by reference. Environmental barrier coatings are described in U.S. Pat. No. 5,626,923 to Fitzgibbons et al., and U.S. Pat. No. 6,921,431 to Evans et al., each of which is incorporated by reference. Matrix/reinforcement interphase weakening is described in U.S. Pat. No. 4,642,271 to Rice, which is incorporated by reference.

None of the known coating technologies overcome the conversion shrink phenomenon in the production of reinforced ceramics, such as ceramic matrix composites made from pre-ceramic polymers or by other fabrication techniques.

SUMMARY OF THE INVENTION

Some variations of the invention provide a pre-ceramic matrix composite comprising:
(a) a precursor matrix comprising a pre-ceramic material;
(b) one or more reinforcing elements disposed within the precursor matrix, wherein the one or more reinforcing elements each contain a reinforcement material; and
(c) a compressible material disposed on the surface of the one or more reinforcing elements and interposed between the one or more reinforcing elements and the precursor matrix.

The reinforcing elements may be discrete, semi-continuous, continuous, or a combination thereof. For example, there may be a single reinforcing element that is a continuous fiber in the precursor matrix.

In some embodiments, the pre-ceramic material is a pre-ceramic polymer. The pre-ceramic polymer may be selected from the group consisting of polycarbosilanes, polycarbosiloxanes, polycarbosilazanes, polysiloxanes, polysilsequioxanes, polysilylcarbodiimides, polysilesquicarbodiimides, polysilsesquiazanes, polysilazanes, polyborosilazanes, polyborosilanes, polyborosiloxanes, and combinations thereof, for example.

In some embodiments, the one or more reinforcing elements have an average maximum dimension of about 5 microns to about 1 millimeter and an average length-to-thickness aspect ratio of about 1 to about 50. The one or more reinforcing elements may be in the form of particles, platelets, short fibers, long fibers, whiskers, hollow spheres, dense spheres, or a combination thereof.

The reinforcement material may be present in a volume fraction from about 5% to about 60% based on the total volume of the pre-ceramic matrix composite.

The reinforcement material may be characterized by a Young's modulus of at least 20 GPa, such as at least 100 GPa. The reinforcement material may be characterized by thermal stability at a temperature from about 500° C. to about 3000° C.

In some embodiments, the reinforcement material is selected from the group consisting of SiC, $Si_3N_4$, SiOC, SiOCN, SiON, $B_4C$, ZrC, HfC, TiC, WC, TiN, HfN, ZrN, AlON, $Al_2O_3$, $SiO_2$, $Al_2O_3$—$SiO_2$ silicates, $TiO_2$, CaO, $GeO_2$, $ZrO_2$, $Y_2O_3$, $ZrB_2$, $TiB_2$, $ZrB_2$, $HfB_2$, $VB_2$, $NbB_2$, TaB, $TaB_2$, and combinations thereof.

In some embodiments, the reinforcement material is selected from the group consisting of Ti, Zr, Ni, Al, W, Nb, Cr, Ta, Cu, Fe, Co, Y, and combinations or alloys thereof.

The compressible material may be selected from the group consisting of thermoset polymers, thermoplastic polymers, metals, ceramic materials, carbon, and combinations thereof.

In some embodiments, the compressible material is selected from the group consisting of polyethylene, polypropylene, parylene, polystyrene, phenolic polymers, polycarbosilane, polycarbosiloxane, polycarbosilazane, Ni, Ni—Fe alloys, Cu, Au, Ag, Cr, Zn, Sn, $SiO_2$, SiOC, SiOCN, SiON, SiTiCO, SiAlCO, SiBCN, SiAlON, $Ti_3AlC_2$, $Ti_2AlC$, $Ti_4AlN_3$, $Ti_3GaC_2$, $Ti_3SnC_2$, $B_2O_3$, C, and combinations thereof.

The compressible material may be characterized by thermal stability at a temperature from about 500° C. to about 1800° C., for example.

In some embodiments, the compressible material is characterized by a compressibility of greater than about 5%, such as about, or at least about, 10%, 15%, 20%, 25%, 30%, 40%, 50%, 60%, 70%, 80%, or 90%. "Compressibility" is a percentage reduction in the linear dimension of the coating thickness and includes not only mechanical compressibility but also any other chemical or thermal means of reducing thickness, as described in more detail later in this specification.

In some embodiments, the compressible material has a thickness less than or equal to the average thickness of the one or more reinforcing elements.

The compressible material may form a continuous coating on the surface of one or more reinforcing elements. Alternatively, or additionally (e.g., on different reinforcing elements), the compressible material may form a discontinuous coating on the surface of one or more reinforcing elements. Alternatively, or additionally, the compressible material may form a surface-patterned coating on the surface of the one or more reinforcing elements.

In some pre-ceramic matrix composites, the compressible material has a porosity from about 5% to about 90%.

Other variations provide a ceramic matrix composite comprising:
(a) a matrix comprising a ceramic material;
(b) one or more reinforcing elements disposed within the matrix, wherein the one or more reinforcing elements each contain a reinforcement material; and
(c) a compressed material disposed on the surface of the one or more reinforcing elements and interposed between the one or more reinforcing elements and the matrix.

In various embodiments, the ceramic material is an oxide, a carbide, a nitride, or a combination thereof. In some embodiments, the ceramic material is selected from the group consisting of SiC, $Si_3N_4$, $SiO_2$, SiOC, SiOCN, SiON, SiTiCO, SiAlCO, SiBCN, BN, SiAlON, $B_4C$, $Al_2O_3$, mullite, AlON, $SiO_2$, $TiO_2$, $GeO_2$, $ZrO_2$, and combinations thereof, for example.

Within the ceramic matrix composite, the one or more reinforcing elements may have an average maximum dimension of about 5 microns to about 1 millimeter and an average length-to-thickness aspect ratio of about 1 to about 50. The one or more reinforcing elements may be in the form of particles, platelets, short fibers, long fibers, whiskers, hollow spheres, dense spheres, or a combination thereof.

In some embodiments, the reinforcement material is present in a volume fraction from about 5% to about 60% based on the total volume of the ceramic matrix composite.

The reinforcement material may be characterized by a Young's modulus of at least 20 GPa, such as at least 100 GPa, within the ceramic matrix composite.

In some embodiments, the reinforcement material is selected from the group consisting of SiC, $Si_3N_4$, SiOC, SiOCN, SiON, $B_4C$, ZrC, HfC, TiC, WC, TiN, HfN, ZrN, AlON, $Al_2O_3$, $SiO_2$, $Al_2O_3$—$SiO_2$ silicates, $TiO_2$, CaO, $GeO_2$, $ZrO_2$, $Y_2O_3$, $ZrB_2$, $TiB_2$, $ZrB_2$, $HfB_2$, $VB_2$, $NbB_2$, $TaB$, $TaB_2$, and combinations thereof.

In some embodiments, the reinforcement material is selected from the group consisting of Ti, Zr, Ni, Al, W, Nb, Cr, Ta, Cu, Fe, Co, Y, and combinations or alloys thereof.

The compressed material may be selected from the group consisting of pyrolyzed thermoset polymers, pyrolyzed thermoplastic polymers, metals, ceramic materials, carbon, and combinations thereof. For example, the compressed material may be selected from the group consisting of pyrolyzed polyethylene, pyrolyzed polypropylene, pyrolyzed parylene, pyrolyzed polystyrene, pyrolyzed phenolic polymers, pyrolyzed polycarbosilane, pyrolyzed polycarbosiloxane, pyrolyzed polycarbosilazane, Ni, Ni—Fe alloys, Cu, Au, Ag, Cr, Zn, Sn, $SiO_2$, SiOC, SiOCN, SiON, SiTiCO, SiAlCO, SiBCN, SiAlON, $Ti_3AlC_2$, $Ti_2AlC$, $Ti_4AlN_3$, $Ti_3GaC_2$, $Ti_3SnC_2$, $B_2O_3$, C, and combinations thereof.

In some ceramic matrix composites, the compressed material is a compressed form of a compressible material that is characterized by a compressibility of greater than about 5%, such as about, or at least about, 10%, 15%, 20%, 25%, 30%, 40%, 50%, 60%, 70%, 80%, or 90%.

The compressed material may have a thickness less than or equal to the average thickness of the one or more reinforcing elements.

Within the ceramic matrix composite, the compressed material may form a continuous coating on the surface of one or more reinforcing elements. Alternatively, or additionally (e.g., on different reinforcing elements), the compressed material may form a discontinuous coating on the surface of one or more reinforcing elements. Alternatively, or additionally, the compressed material may form a surface-patterned coating on the surface of the one or more reinforcing elements.

In some ceramic matrix composites, the compressed material has a porosity from 0 (fully dense) to about 90%.

Some variations of the invention provide a method to make a ceramic matrix composite, the method comprising:

(a) providing a precursor matrix comprising a pre-ceramic material;

(b) providing one or more reinforcing elements, wherein the one or more reinforcing elements each contain a reinforcement material;

(c) coating a compressible material on the surface of the one or more reinforcing elements, to generate one or more coated reinforcing elements;

(d) disposing the one or more coated reinforcing elements within the precursor matrix, thereby generating a pre-ceramic matrix composite;

(e) thermally treating the pre-ceramic matrix composite to convert the pre-ceramic material into a ceramic material with associated densification, wherein the compressible material converts to a compressed material to absorb strain energy associated with the densification, thereby generating a ceramic matrix composite containing a matrix comprising the ceramic material and the one or more reinforcing elements coated with the compressed material; and (f) recovering the ceramic matrix composite.

In some methods, step (e) employs pyrolysis of a pre-ceramic polymer into a ceramic material. In some methods, step (e) employs sintering. In some methods, step (e) employs sol-gel processing.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF EMBODIMENTS OF THE INVENTION

Figure 1:
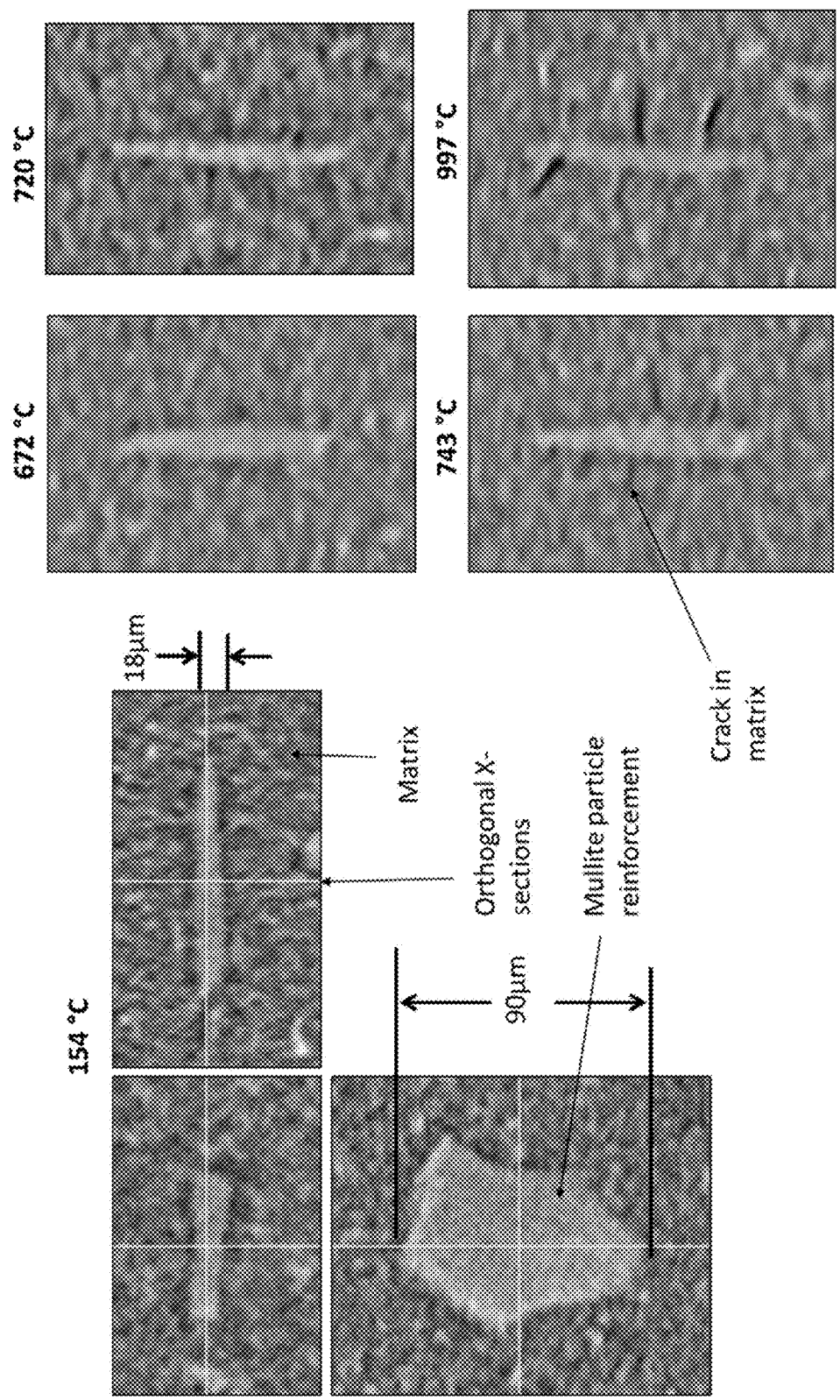
FIG. 1 reveals cross-sections from X-ray computed tomographic (XCT) reconstructions of a carbosilane-based pre-ceramic polymer matrix (precursor matrix) undergoing conversion to a silicon oxycarbide (SiOC) ceramic matrix during a high-temperature pyrolysis process.

The materials, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the invention are predicated on a ceramic matrix composite containing reinforcing elements that are surface-coated with a compressible material. The coating of compressible material inhibits the cracking tendency of the ceramic matrix during processing, and preferably prevents cracking during processing. Cracks are avoided because the coating absorbs stresses associated with volumetric shrinkage of the ceramic matrix, thereby reducing the stresses at the interface between the reinforcing elements and the ceramic matrix. In this disclosure, a "reinforcement" is synonymous with a "reinforcing element" and refers to an object that is contained within a matrix of ceramic material.

Variations of the invention may be applied to ceramic processing techniques in which the ceramic material volumetrically shrinks during the fabrication process. The term "densification" as meant herein refers to a process in which a ceramic material volumetrically shrinks to some measurable extent. Densification processes include, but are not limited to, processes for pre-ceramic polymer conversion to a ceramic material, processing to sinter ceramic powders, processing to sinter polymer/ceramic slurries, and sol-gel processes.

This invention may be applied to reinforcing elements of any form factor, including, but no limited to, particles, platelets, short fibers, long fibers, and whiskers. The invention enables large (>1 micron thickness) and/or high-aspect-ratio (>5 length/thickness) reinforcements to be integrated into ceramics without compromising the quality of the ceramic material and preferably improving at least one property, such as mechanical toughness.

Experimental evidence of the shrink phenomenon is depicted in FIG. 1, which shows silicon oxycarbide ceramic matrix composites containing high-aspect-ratio mullite reinforcing elements but no compressible coating. FIG. 1 reveals cross-sections from X-ray computed tomographic (XCT) reconstructions of a carbosilane-based pre-ceramic polymer matrix (precursor matrix) undergoing conversion to a silicon oxycarbide (SiOC) ceramic matrix during a high-temperature pyrolysis process. In the process, the precursor matrix evolves to the ceramic matrix during pyrolysis. Within the evolving matrix are mullite ($Al_6Si_2O_{13}$) particle reinforcements. As shown in the images of FIG. 1, as the pyrolysis temperature increases from 154° C. to 997° C., crack formation is shown at 743° C. and is more significant at 997° C. Cracks within the evolving matrix begin forming at the mullite/SiOC interface and radially extend outward from the mullite particles. The cracks grow in length during the course of the polymer-to-ceramic conversion process.

Figure 2:
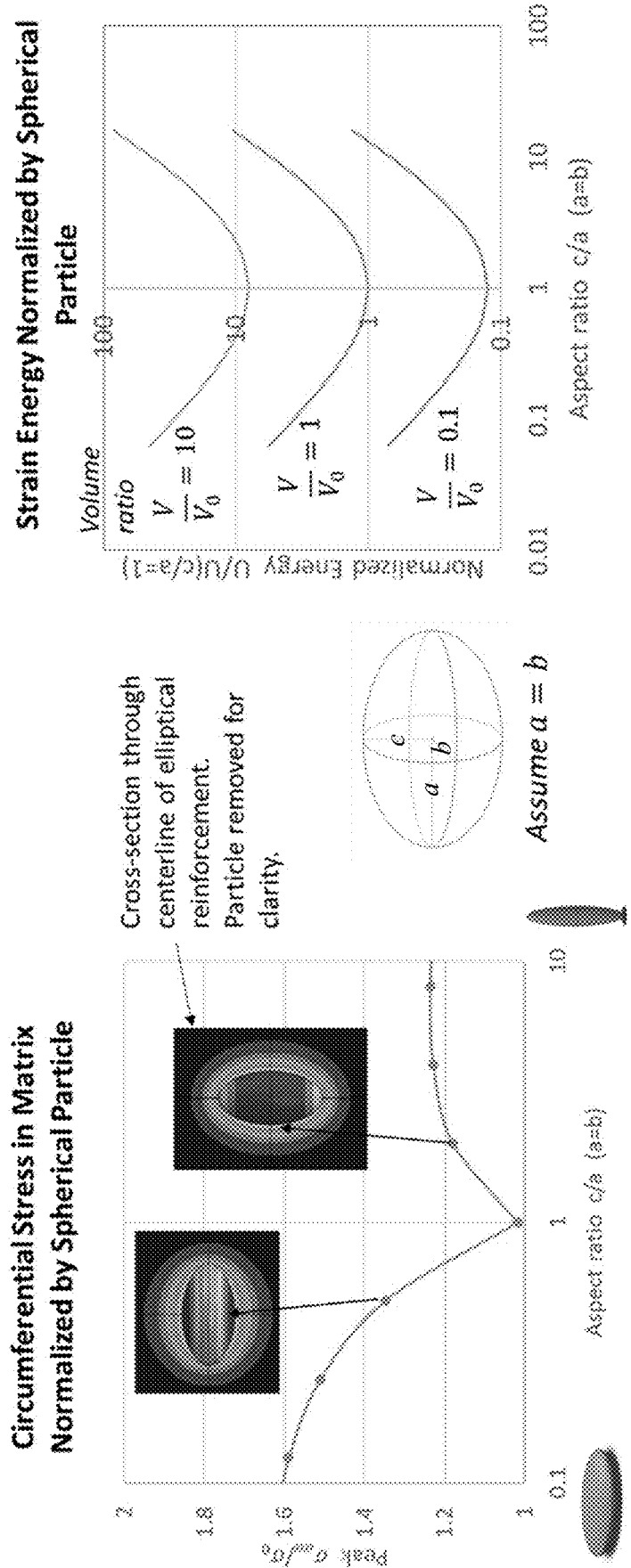
FIG. 2 depicts finite element analysis (FEA) of the stress around an elliptically shaped particle as a reinforcing element.

FIG. 2 depicts finite element analysis (FEA) of the stress around an elliptically shaped particle as a reinforcing element. The maximum tensile stresses within the ceramic matrix in a direction tangential to the particle are shown. This stress (y-axis, left-hand graph) increases as the aspect ratio (x-axis) of the reinforcing element departs from a value of 1. The strain energy (y-axis, right-hand graph), which drives crack formation, increases with the aspect ratio of the reinforcing element and with reinforcement volume. This FEA model demonstrates that the magnitude of the stress and of the strain energy both increase with reinforcing-element aspect ratio and reinforcement volume. The stress and strain lead to shrinkage and consequent cracking as explained earlier.

Figure 3:
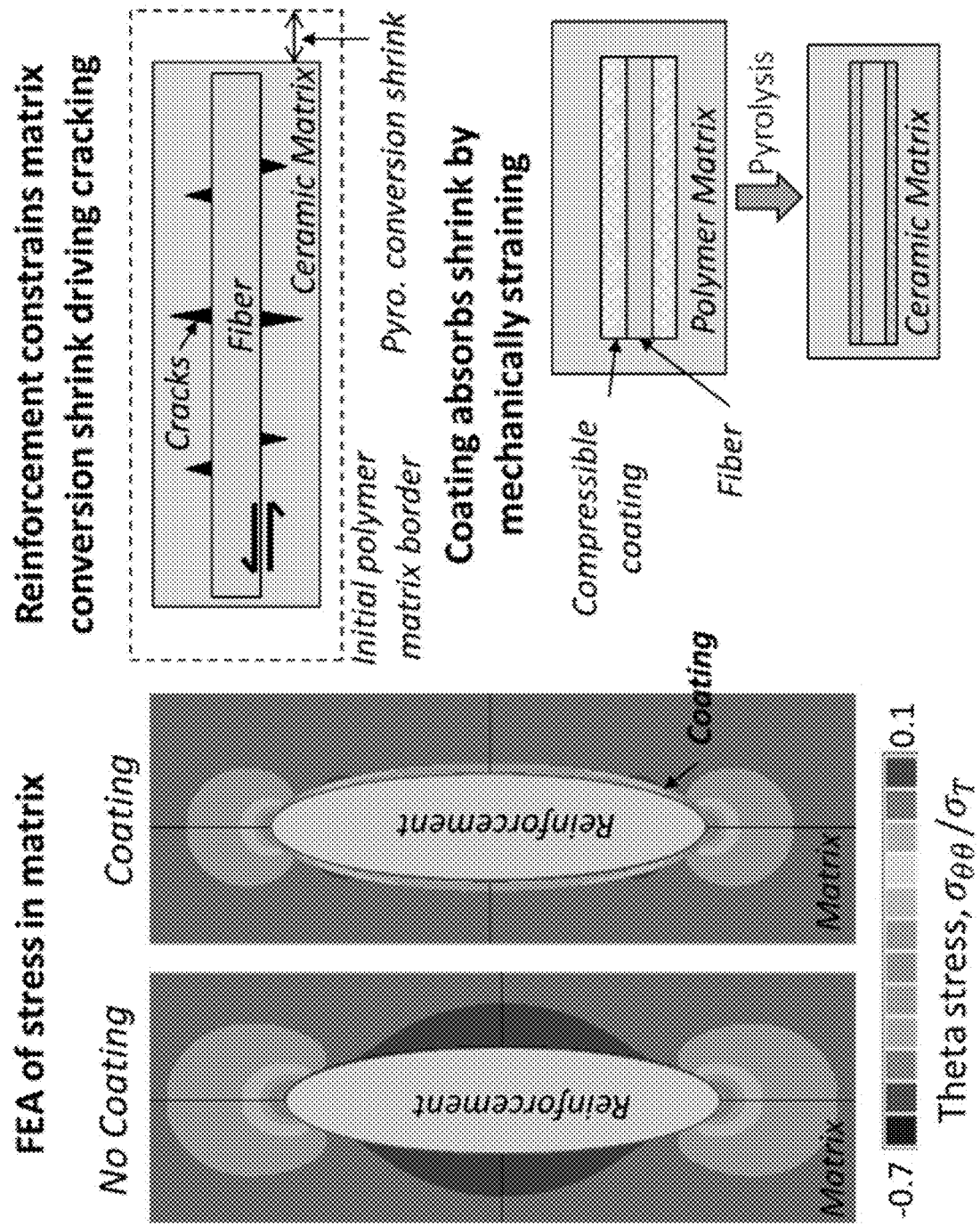
FIG. 3 depicts a FEA model of the stress around an elliptically shaped particle that includes a compressible coating (in contrast to FIG. 1 or FIG. 2), in some embodiments of the invention.

To overcome the shrinkage during the formation of ceramic materials, a compressible coating is applied to the reinforcing elements in order to soften the interface and absorb matrix shrinkage. The tensile stresses within the evolving matrix that would otherwise cause cracking, are reduced or entirely avoided. FIG. 3 depicts a FEA model of the stress around an elliptically shaped particle that includes a compressible coating (in contrast to FIG. 1 or FIG. 2). Reinforcing elements (e.g., reinforcing particles) with a compressible coating reduce the stress in the matrix and also reduce the strain energy. Reinforcing elements with a compressible coating reduce the propensity for crack formation in the ceramic matrix, especially at the interface between the elliptically shaped particles and the ceramic matrix.

Some variations of the invention provide a pre-ceramic matrix composite comprising:
  (a) a precursor matrix comprising a pre-ceramic material;
  (b) one or more reinforcing elements disposed within the precursor matrix, wherein the one or more reinforcing elements each contain a reinforcement material; and
  (c) a compressible material disposed on the surface of the one or more reinforcing elements and interposed between the one or more reinforcing elements and the precursor matrix.

In some embodiments, the pre-ceramic material is a pre-ceramic polymer. The pre-ceramic polymer may be selected from the group consisting of polycarbosilanes, polycarbosiloxanes, polycarbosilazanes, polysiloxanes, polysilsequioxanes, polysilylcarbodiimides, polysilesquicarbodiimides, polysilsesquiazanes, polysilazanes, polyborosilazanes, polyborosilanes, polyborosiloxanes, and combinations thereof, for example.

"Pre-ceramic" in this disclosure refers to the capability to be ultimately converted to a ceramic material. A "pre-ceramic composition" is a composition that can be converted into a ceramic material, either directly (e.g., by pyrolysis) or via multiple steps (e.g., by polymerization followed by pyrolysis). In particular, a pre-ceramic composition may contain a pre-ceramic polymer that can be pyrolyzed into a ceramic material, a resin that can be polymerized into a pre-ceramic polymer, or both of these. A "pre-ceramic polymer" is characterized in that at least some of the polymer converts to a ceramic material when heated to a temperature above 400° C. at atmospheric pressure in a substantially inert gas environment. Preferably, at least 50 wt %, more preferably at least 90 wt %, and most preferably at least 99 wt % (e.g., essentially all) of the polymer converts to a ceramic material when heated to a temperature above 200° C. at atmospheric pressure in a substantially inert gas environment.

The reinforcing elements may be discrete, semi-continuous, continuous, or a combination thereof. For example, there may be a single reinforcing element that is a continuous fiber in the precursor matrix.

In some embodiments, the one or more reinforcing elements have an average maximum dimension of about 5 microns to about 1 millimeter and an average length-to-thickness aspect ratio of about 1 to about 50. The one or more reinforcing elements may be in the form of particles, platelets, short fibers, long fibers, whiskers, hollow spheres, dense spheres, or a combination thereof.

The reinforcement material may be present in a volume fraction from about 5% to about 60% based on the total volume of the pre-ceramic matrix composite.

The reinforcement material may be characterized by a Young's modulus of at least 20 GPa, such as at least 100 GPa. The reinforcement material may be characterized by thermal stability at a temperature from about 500° C. to about 3000° C. Thermal stability at very high temperatures (e.g., >2000° C.) is important for ultrahigh-temperature applications employing carbides or borides, for example.

In some embodiments, the reinforcement material is selected from the group consisting of SiC, $Si_3N_4$, SiOC, SiOCN, SiON, $B_4C$, ZrC, HfC, TiC, WC, TiN, HfN, ZrN, AlON, $Al_2O_3$, $SiO_2$, $Al_2O_3$—$SiO_2$ silicates, $TiO_2$, CaO, $GeO_2$, $ZrO_2$, $Y_2O_3$, $ZrB_2$, $TiB_2$, $ZrB_2$, $HfB_2$, $VB_2$, $NbB_2$, $TaB$, $TaB_2$, and combinations thereof.

In some embodiments, the reinforcement material is selected from the group consisting of Ti, Zr, Ni, Al, W, Nb, Cr, Ta, Cu, Fe, Co, Y, and combinations or alloys thereof.

The reinforcement material may be integrated into the pre-ceramic matrix by dispersion, mixing, tumbling, infiltrating, or other means. The reinforcement material may be introduced into the pre-ceramic matrix as already-formed reinforcing elements. Alternatively, or additionally, the reinforcement material may be introduced into the pre-ceramic matrix and then the reinforcement material segregates or aggregates into one or more reinforcing elements.

The compressible material may be selected from the group consisting of thermoset polymers, thermoplastic polymers, metals, ceramic materials, carbon, and combinations thereof. The compressible material may be a combination or mixture of several components, each of which is compressible, or only some (or one) of which is compressible. Preferably, when multiple components are utilized in the compressible material, all components are compressible.

In some embodiments, the compressible material is selected from the group consisting of polyethylene, polypropylene, parylene, polystyrene, phenolic polymers, polycarbosilane, polycarbosiloxane, polycarbosilazane, Ni, Ni—Fe alloys, Cu, Au, Ag, Cr, Zn, Sn, $SiO_2$, SiOC, SiOCN, SiON, SiTiCO, SiAlCO, SiBCN, SiAlON, $Ti_3AlC_2$, $Ti_2AlC$, $Ti_4AlN_3$, $Ti_3GaC_2$, $Ti_3SnC_2$, $B_2O_3$, C, and combinations thereof.

Other MAX phases are possible for the compressible material. Generally, a "MAX phase" is $M_{n+1}AX_n$, wherein n=1 to 4; M is an early transition metal such as Sc, Ti, V, Cr, Zr, Nb, Mo, Hf, or Ta; A is a group-A element such as Al, Si, P, S, Ga, Ge, As, Cd, In, Sn, Tl, or Pb; and X is carbon and/or nitrogen. Known MAX phases include $Mo_4VAlC_4$, $Ti_4AlN_3$, $V_4AlC_3$, $Ti_4GaC_3$, $Ti_4SiC_3$, $Ti_4GeC_3$, $Nb_4AlC_3$, $Ta_4AlC_3$, $Mo_4AlC_3$, $V_4AlC_3$, $Ti_3AlC_2$, $Ti_3GaC_2$, $Ti_3InC_2$, $V_3AlC_2$, $Ti_3SiC_2$, $Ti_3GeC_2$, $Ti_3SnC_2$, $Ta_3AlC_2$, $Ti_3ZnC_2$, $Zr_3AlC_2$, $Ti_2CdC$, $Sc_2InC$, $Sc_2SnC$, $Ti_2AlC$, $Ti_2GaC$, $Ti_2InC$, $Ti_2TlC$, $V2AlC$, $V_2GaC$, $Cr_2GaC$, $Ti_2AlN$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2AlC$, $Cr_2GeC$, $V_2PC$, $V_2AsC$, $Ti_2SC$, $Zr_2InC$, $Zr_2TlC$, $Nb_2AlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2AlC$, $Ta_2GaC$, $Hf_2SnC$, $Hf_2PbC$, $Hf_2SnN$, $Hf_2SC$, $Zr_2AlC$, $Ti_2ZnC$, $Ti_2ZnN$, $V_2ZnC$, $Nb_2CuC$, $Mn_2GaC$, $Mo_2AuC$, $Ti_2AuN$, or a combination thereof.

In the pre-ceramic matrix composite, an interphase will exist between each component and its neighbor. As intended herein, an "interphase" is a region of material between two other phases or components. An interphase may be coherent, semi-coherent, or incoherent. An interphase may be a sharp distinction between components, in which case the interphase may be referred to as an interface. Alternatively, or additionally (e.g., in different surface locations), an interphase may have a relatively large thickness, such as in a complexion phase. In the pre-ceramic matrix composite, there will be an interphase between the precursor matrix and the coating, as well as an interphase between the compressible coating and a reinforcing element. If there are some reinforcing elements that are not completely coated with compressible material, then there will also be an interphase between the precursor matrix and the reinforcing element.

The compressible material may be characterized by thermal stability at a temperature from about 500° C. to about 1800° C., for example.

In some embodiments, the compressible material is characterized by a compressibility of greater than about 5%, such as about, or at least about, 10%, 15%, 20%, 25%, 30%, 40%, 50%, 60%, 70%, 80%, or 90%. "Compressibility" is a percentage reduction in the linear dimension of the coating thickness and includes not only mechanical compressibility but also any other chemical or thermal means of reducing thickness, as described in more detail later in this specification.

In some embodiments, the compressible material has a thickness less than or equal to the average thickness of the one or more reinforcing elements. For example, the thickness of the compressible material may be about 5%, 10%, 15%, 20%, 25%, 30%, 40%, 50%, 60%, 70%, 80%, 90%, or 100% of the average thickness of the reinforcing elements.

The compressible material may form a continuous coating on the surface of one or more reinforcing elements. Alternatively, or additionally (e.g., on different reinforcing elements), the compressible material may form a discontinuous coating on the surface of one or more reinforcing elements. Alternatively, or additionally, the compressible material may form a surface-patterned coating on the surface of the one or more reinforcing elements. The coating may be a continuous coating with full surface coverage, or a discontinuous coating with less than full surface coverage. The coating may be uniform on a given reinforcing element, compositionally and/or dimensionally, or may be non-uniform such as with graded compositions or different coating thicknesses at different regions of a reinforcing element.

In some pre-ceramic matrix composites, the compressible material has a porosity from about 5 vol % to about 90 vol %. In various embodiments, the compressible material has a porosity of about, or at least about 5, 10, 15, 20, 25, 30, 40, 50, 60, 70, 75, 80, 85, 90, or 95 vol %, including any intervening ranges.

Other variations provide a ceramic matrix composite comprising:
(a) a matrix comprising a ceramic material;
(b) one or more reinforcing elements disposed within the matrix, wherein the one or more reinforcing elements each contain a reinforcement material; and (c) a compressed material disposed on the surface of the one or more reinforcing elements and interposed between the one or more reinforcing elements and the matrix.

In various embodiments, the ceramic material is an oxide, a carbide, a nitride, or a combination thereof. In some embodiments, the ceramic material is selected from the group consisting of SiC, $Si_3N_4$, $SiO_2$, SiOC, SiOCN, SiON, SiTiCO, SiAlCO, SiBCN, SiBN, BN, SiAlON, $B_4C$, $Al_2O_3$, mullite, AlON, $SiO_2$, $TiO_2$, $GeO_2$, $ZrO_2$, and combinations thereof, for example. In the ceramic matrix composite, the matrix contains at least a ceramic material and potentially other materials, such as additives.

The ceramic material is a densified form of the pre-ceramic material described earlier in the specification. The densification may utilize thermal decomposition. In common embodiments, pyrolysis of a pre-ceramic polymer creates a ceramic material. Pre-ceramic polymers include, but are not limited to, polysiloxanes, polysilsequioxanes, polycarbosiloxanes, polycarbosilanes, polysilylcarbodiimides, polysilesquicarbodiimides, polysilsesquiazanes, polysilazanes, polyborosilazanes, polyborosilanes, polyborosiloxanes, and combinations thereof. For example when polyborosilazane is employed as a pre-ceramic polymer, the ceramic material is pyrolyzed polyborosilazane which will primarily be SiBN and may also contain other ceramic materials such as BN or $Si_3N_4$, other reaction products that are not necessarily ceramic materials, and possibly unreacted polyborosilazane.

The densification of a pre-ceramic material may utilize other techniques, including but not limited to sintering and sol-gel processing. Sinterable materials include oxides, such as $SiO_2$, $Al_2O_3$, mullite, and $Y_2O_3$. Materials resulting from sol-gel processes include $TiO_2$, $GeO_2$, and $ZrO_2$.

The reinforcing elements in the ceramic matrix composite are the same as the reinforcing elements in the pre-ceramic matrix composite described above. In the pyrolysis process to convert the pre-ceramic matrix to the ceramic matrix composite, the reinforcing elements typically do not themselves change chemically or physically, although small changes may occur at high temperatures.

Within the ceramic matrix composite, the one or more reinforcing elements may have an average maximum dimension of about 5 microns to about 1 millimeter and an average length-to-thickness aspect ratio of about 1 to about 50. The one or more reinforcing elements may be in the form of particles, platelets, short fibers, long fibers, whiskers, hollow spheres, dense spheres, or a combination thereof.

The reinforcing elements may be discrete, semi-continuous, continuous, or a combination thereof. For example, there may be a single reinforcing element that is a continuous fiber in the ceramic matrix.

In some embodiments, the reinforcement material is present in a volume fraction from about 5% to about 60% based on the total volume of the ceramic matrix composite. The total volume of reinforcement material is the sum of volumes of reinforcement material contained in all individual reinforcing elements.

The reinforcement material is preferably a mechanically stiff material. The reinforcement material may be characterized by a Young's modulus of at least 20 GPa, such as at least 100 GPa, within the ceramic matrix composite. In various embodiments, the reinforcement material may be characterized by a Young's modulus of about, or at least about, 20, 30, 40, 50, 60, 70, 80, 90, 100, 125, 150, 200, 250, or 300 GPa, including all intervening ranges.

In some embodiments, the reinforcement material is selected from the group consisting of SiC, $Si_3N_4$, SiOC, SiOCN, SiON, $B_4C$, ZrC, HfC, TiC, WC, TiN, HfN, ZrN, AlON, $Al_2O_3$, $SiO_2$, $Al_2O_3$—$SiO_2$ silicates, $TiO_2$, CaO, $GeO_2$, $ZrO_2$, $Y_2O_3$, $ZrB_2$, $TiB_2$, $ZrB_2$, $HfB_2$, $VB_2$, $NbB_2$, $TaB$, $TaB_2$, and combinations thereof.

In some embodiments, the reinforcement material is selected from the group consisting of Ti, Zr, Ni, Al, W, Nb, Cr, Ta, Cu, Fe, Co, Y, and combinations or alloys thereof.

The compressible material of the pre-ceramic matrix composite is converted, at least in part, to the compressed material of the ceramic matrix composite. In pyrolysis embodiments employing a pre-ceramic polymer as the compressible material, the compressed material is a pyrolyzed version of the compressible material. In some embodiments employing ceramics and/or metals as the compressible material, the compressed material may be compositionally the same as the compressible material.

The compressed material may be selected from the group consisting of pyrolyzed thermoset polymers, pyrolyzed thermoplastic polymers, metals, ceramic materials, carbon, and combinations thereof. For example, the compressed material may be selected from the group consisting of pyrolyzed polyethylene, pyrolyzed polypropylene, pyrolyzed parylene, pyrolyzed polystyrene, pyrolyzed phenolic polymers, pyrolyzed polycarbosilane, pyrolyzed polycarbosiloxane, pyrolyzed polycarbosilazane, Ni, Ni—Fe alloys, Cu, Au, Ag, Cr, Zn, Sn, $SiO_2$, SiOC, SiOCN, SiON, SiTiCO, SiAlCO, SiBCN, SiAlON, $Ti_3AlC_2$, $Ti_2AlC$, $Ti_4AlN_3$, $Ti_3GaC_2$, $Ti_3SnC_2$, $B_2O_3$, C, and combinations thereof.

The compressed material of the ceramic matrix composite may be analyzed to determine what was the starting material. The compressible material of the pre-ceramic matrix composite typically leaves some sort of "fingerprint" in the final compressed material. For example, a pyrolyzed polymer such as pyrolyzed polyethylene may be analyzed to demonstrate that it was in fact derived from polyethylene. Analysis may include, for example, elemental analysis to measure the presence of C, H, O, N, S, and/or other elements in the compressed material. Elemental analysis may utilize X-ray fluorescence spectrometry or Fourier-transform infrared spectroscopy, for example. Other types of analysis of the compressed material may include determination of heating value via a combustion test; surface analysis, e.g. adsorption-desorption isotherms; and measurement of density. The carbon bonding present may be analyzed to determine carbon bond type (e.g., $sp^2$ versus $sp^3$), via X-ray absorption spectroscopy, for example. It is possible that the compressed material contains carbon for which it cannot easily be determined the source of that carbon. It is also possible that the solid compressed material does not directly indicate the source, but that there are pyrolysis liquids contained elsewhere in the composition and/or pyrolysis off-gases deposited elsewhere in the composition, or externally, that collectively form a fingerprint of the compressible material as source, following pyrolysis, of compressed material.

In some ceramic matrix composites, the compressed material is a compressed form of a compressible material that is characterized by a compressibility of greater than about 5%, such as about, or at least about, 10%, 15%, 20%, 25%, 30%, 40%, 50%, 60%, 70%, 80%, or 90%.

Within the ceramic matrix composite, the compressed material may form a continuous coating on the surface of one or more reinforcing elements. Alternatively, or additionally (e.g., on different reinforcing elements), the compressed material may form a discontinuous coating on the surface of one or more reinforcing elements. Alternatively, or additionally, the compressed material may form a surface-patterned coating on the surface of the one or more reinforcing elements.

Figure 4A:
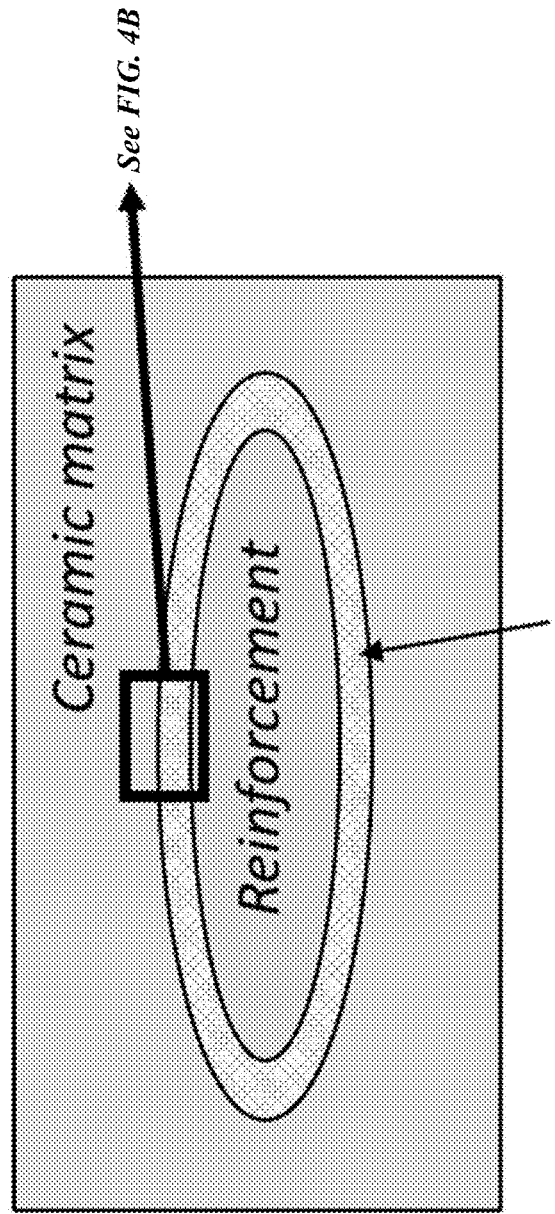
FIG. 4A depicts a ceramic matrix composite according to some embodiments.
Figure 4B:
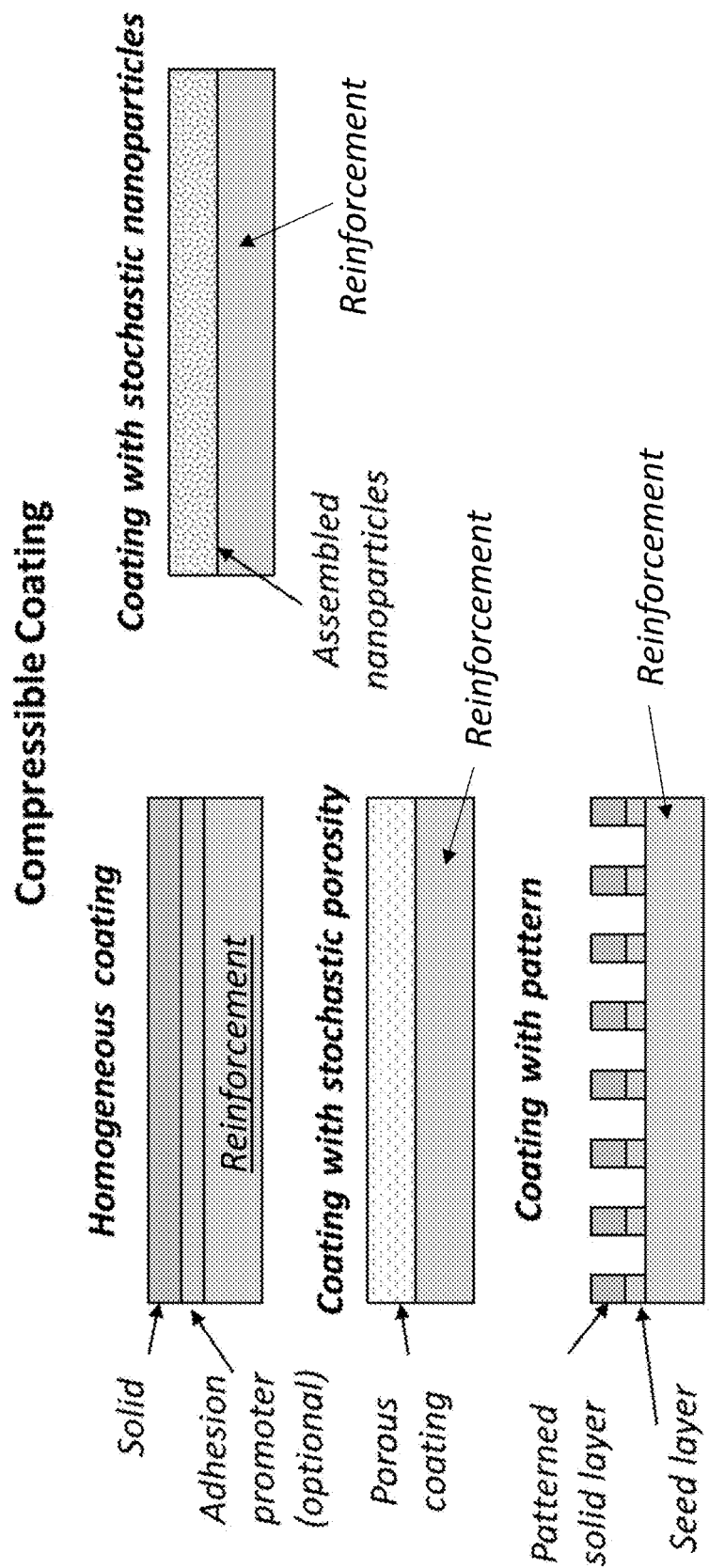
FIG. 4B depicts various examples of compressed or compressible coatings, including a homogeneous coating with an optional adhesion promotor, a coating with stochastic porosity, a coating with a surface pattern with optional seed layer, and a coating with stochastically assembled nanoparticles, in various embodiments.

FIGS. 4A and 4B depict various examples of compressed or compressible coatings, including a homogeneous coating with an optional adhesion promotor, a coating with stochastic porosity, a coating with a surface pattern with optional seed layer, and a coating with stochastically assembled nanoparticles. Other variations of the structures shown in FIG. 4B include patterns formed from nanoparticles, a homogenous coating of nanoparticles, multiple particle dimensions to create coating porosity, etc. In FIGS. 4A and 4B, the reinforcement phase of a reinforcing element is depicted. The ceramic matrix of FIG. 4A (gray region) is not shown in FIG. 4B for clarity. In both FIG. 4A and FIG. 4B, the reference to "compressible coating" may be replaced with "compressed coating" when the structures are depicting final ceramic matrix composites.

In the ceramic matrix composite, an interphase will exist between each component and its neighbor. In the ceramic matrix composite, there will be an interphase between the ceramic matrix and the compressed coating, as well as an interphase between the compressed coating and a reinforcing element. If there are some reinforcing elements that are not completely coated with compressed material, then there will also be an interphase between the ceramic matrix and the reinforcing element. An interphase may be coherent, semi-coherent, or incoherent. An interphase may be a sharp distinction between components, in which case the interphase may be referred to as an interface. Alternatively, or additionally (e.g., in different surface locations), an interphase may have a relatively large thickness, such as in a complexion phase.

Typically, each of the ceramic material in the ceramic matrix, the reinforcing elements, and the compressed material have different chemical composition. In some embodiments, the ceramic material and the reinforcing elements have the same chemical composition. In some embodiments, the ceramic material and the compressed material have the same chemical composition. In some embodiments, the reinforcing elements and the compressed material have the same chemical composition. In certain embodiments, the ceramic material, the reinforcing elements, and the compressed material all have the same chemical composition. Typically, when the same chemical composition is employed for different components, there will be distinct physical features or properties that are measurable—such as density, porosity, crystallinity, alloy phases—that enable delineation of ceramic matrix, reinforcing elements, and/or compressible coating.

In some ceramic matrix composites, the compressed material has a porosity from 0 (fully dense) to about 90%. In various embodiments, the compressed material has a porosity of about, at least about, or at most about 5%, 10%, 15%, 20%, 25%, 30%, 40%, 50%, 60%, 70%, 80%, or 90%, including all intervening ranges.

Various embodiments and examples of the present invention will now be further described, without limiting the scope claimed herein.

In some embodiments, the reinforcing elements are fabricated from a reinforcement material that has a melting temperature higher than the maximum processing temperature, including the process to add the compressible coating to the reinforcing elements and the process to form the ceramic matrix. For example, pyrolysis of a pre-ceramic polymer to a ceramic material is typically accomplished at temperatures from about 800° C. to about 1200° C. The melting temperature of the reinforcing elements is preferably higher than the maximum pyrolysis temperature (e.g., 1200° C.). Other processes to prepare a ceramic matrix employ lower temperatures, such as sol-gel processes, may employ relatively low temperatures, such as about 100° C. to 500° C., in which case the melting temperature of the reinforcement material may be lower than that tolerated in a pyrolysis process.

In some embodiments, the reinforcing elements are resistant to chemical reactions with the compressible material (or a compressed form thereof) and the ceramic material. In other embodiments, chemical reactions are desirable to promote bonding between the reinforcing elements and the compressible material (or a compressed form thereof).

The reinforcement material may be a ceramic material, a nitride, a carbide, a boride, an oxide, or a combination thereof. Reinforcing elements may contain multiple reinforcement materials. Alternatively, or additionally, different reinforcing elements may contain different compositions of reinforcement material. As just one example, a ceramic matrix composite may have a first set of reinforcing elements consisting essentially of SiC and a second set of reinforcing elements consisting essentially of a combination of Ti, $TiO_2$, and TiC.

In various embodiments, a reinforcement material is selected from the group consisting of SiC, $Si_3N_4$, SiOC, SiOCN, SiON, $B_4C$, $Al_2O_3$, AlON, $SiO_2$, $TiO_2$, TiC, $GeO_2$, $ZrO_2$, mullite, $Y_2O_3$, WC, $ZrB_2$, $TiB_2$, $ZrB_2$, $HfB_2$, VB2, $NbB_2$, TaB, $TaB_2$, CaO, and combinations thereof. Alternatively, or additionally, a reinforcement material may be selected from the group consisting of Ti, Zr, Ni, Al, W, Nb, Cr, Ta, Cu, Fe, Co, Y, alloys thereof, and combinations of the foregoing.

The reinforcing elements may take on a wide variety of geometrical shapes, including (but not limited to) particles, platelets, whiskers, short fibers, and long fibers. A reinforcing element may have an irregular shape. A reinforcing element that is a particle may be spherical, cylindrical, cubic, triangular, prismatic, conical, or randomly shaped, for example. A combination of shapes may be employed. As just one example, a first set of reinforcing elements may be spherical, while a second set of reinforcing elements may be prismatic.

The reinforcing elements may have smooth surfaces, rough surfaces, or irregular surfaces. The surface roughness may vary across different reinforcing elements or even on different sides of reinforcing elements.

The reinforcing elements may be fully dense, such as at least 98% of the theoretical density of the reinforcement material (i.e., 2% porosity). The reinforcing elements may be porous, such as having a porosity from about 5% to about 50%. An example of a porous reinforcing element is a sphere with a solid shell and a hollow interior. Combinations of reinforcing elements may be employed in which different reinforcing elements have different porosities.

The reinforcing elements preferably are characterized by a thinnest dimension greater than 0.5 microns, more preferably greater than 5 microns and most preferably greater than 50 microns. The reinforcing elements may be characterized by a thinnest dimension that is preferably less than 1000 microns, more preferably 500 microns or less. Different reinforcing elements may have different thinnest dimensions, in which case the above ranges are on average. The longest dimension may be very high, such as with continuous fibers as reinforcing element(s). The reinforcing elements preferably are characterized an aspect ratio of the longest to thinnest dimension of at least 5, and more preferably at least 10.

In some embodiments, an individual reinforcing element is itself an aggregate of a plurality of reinforcing sub-elements, each of which contains a reinforcement material and has shape as described above. The shape of the reinforcing sub-elements may be uniform, irregular, or a combination of uniform and irregular, within an aggregate. The particle-size distribution within an aggregate may be unimodal, bimodal, trimodal, for example, in reference to the particle sizes of the reinforcing sub-elements. There may be variations in composition across different reinforcing sub-elements within an aggregate, as well as variations in composition and geometries across different aggregates.

The volume fraction of reinforcement material in the ceramic matrix composite may range from about 0.1 vol % to about 60 vol %, for example. Preferably, the volume fraction of reinforcement material in the ceramic matrix composite is selected from about 5 vol % to about 25 vol %, or from about 30 vol % to about 50 vol %.

The reinforcing elements may be coated with an optional layer such as an adhesion promoter layer or a catalyst layer, separately from the compressible coating or mixed into the compressible coating. The adhesion promoter layer enhances adhesion with the compressible material. A catalyst layer may be configured to catalyze reactions that cause the compressible material to chemically convert to the compressed material through a phase change or volume-reducing reaction, for example.

In the following description of a compressible coating—a compressible material disposed on the surface of a reinforcing element—it will be understood the compressible material in the pre-ceramic matrix composite becomes the compressed material in the ceramic matrix composite. For convenience, the compressible coating will be described, it being understood that the material being described may be a compressed coating when the ceramic matrix composite has been formed.

Also, the term "coating" does not limit how the compressible material is applied to the reinforcing-element surface. For example, FIG. 4B shows there may be a pattern of compressed material disposed on a reinforcing element, which may be regarded as a discontinuous coating or even not a coating but rather isolated islands of compressed material protruding out from the surface. For purposes of description, the compressible or compressed material will be described as a coating.

When the pre-ceramic matrix composite is fired into a ceramic matrix composite, the coating is compressed during the heat treatment and absorbs strain energy generated by the shrinkage of the matrix. The coating becomes compressed and is under elastic strain at least for some period of time. The coating may absorb strain by collapsing porosity and/or by other mechanisms. If the coating absorbs strain by mechanical compression, that strain may eventually relax, such that the compressed material may revert to the compressible (but uncompressed) material. The benefit of the invention to avoid cracking during the densification process is still accomplished. That is, the compressible coating has absorbed strain energy generated by matrix shrinkage. After matrix shrinkage is complete, such as following fabrication or during use, the compressed coating does not need to remain compressed.

A compressible coating may contain a single material or multiple materials. The compressible coating may contain a polymer, such as a phenolic polymer, parylene, poly(para-xylene,) polystyrene, polyethylene, a pre-ceramic polymer, or a combination thereof. In one embodiment, the polymer may have a high aromatic content to yield a high volume fraction of carbon upon a high-temperature pyrolytic conversion. In another embodiment, the polymer may have a high volume content of a linear, straight-chain hydrocarbon to primarily decompose into volatile gases upon a high-temperature pyrolytic conversion.

Alternatively, or additionally, the compressible coating may contain a metal, such as Ni, Cu, Au, Ag, Cr, Zn, Sn, Fe, alloys thereof, or a combination of the foregoing. An exemplary alloy is Invar (64FeNi).

Alternatively, or additionally, the compressible coating may contain a ceramic material, such as a nitride or oxide material, e.g. $SiO_2$, SiOC, SiOCN, SiON, SiTiCO, SiAlCO, SiBCN, SiAlON, $B_2O_3$, or a carbon-containing ceramic, e.g. $Ti_3AlC_2$, $Ti_2AlC$, $Ti_4AlN_3$, $Ti_3GaC_2$, $Ti_3SnC_2$, or a combination thereof.

Alternatively, or additionally, the compressible coating may contain carbon. The carbon may be graphitic carbon (e.g., graphite and/or graphene). The carbon may be turbostratic carbon, which has structural ordering in between that of amorphous carbon and crystalline graphite.

In this patent application, compressibility includes any mechanical, chemical, and/or thermal means of reducing the initial thickness of the coating. The coating thickness is the dimension perpendicular to the surface of the reinforcing elements. The compressibility is a percentage reduction in the linear dimension of the coating thickness.

The compressible coating preferably has a compressibility of at least about 5%, more preferably at least about 15%, and most preferably at least about 30%. In various embodiments, the compressible coating has a compressibility of about, at least about, 5%, 10%, 15%, 20%, 25%, 30%, 35%, 40%, 45%, 50%, 55%, 60%, 65%, 70%, 75%, 80%, 85%, or 90%, including all intervening ranges (e.g., 5-30% or 10-40%).

In some embodiments, coating compressibility arises from mechanical compression forces.

Alternatively, or additionally, compressibility may arise from the conversion from one composition or phase to another composition or phase. For example, the active compression mechanism in the case of polymer coatings may be the conversion of a polymer to a carbonaceous material and/or a ceramic material. These conversion reactions release gaseous products, which causes a mass loss and normally a volume loss.

Alternatively, or additionally, compressibility may arise from a phase sublimating at elevated temperature or a metal salt that evaporates. For example, $ZnBr_2$ melts at 400° C. and boils at 650° C., while $MgBr_2$ melts at 710° C. and boils at 1280° C. When the compressible material contains $ZnBr_2$, and the processing temperature exceeds 650° C., for instance, the zinc bromide will vaporize and reduce the thickness of the coating.

Alternatively, or additionally, compressibility may arise from a phase decomposing at elevated temperature. For example, $CaCO_3$ decomposes to CaO and $CO_2$ at temperatures of 825-899° C.; $ZnCO_3$ loses $CO_2$ and forms ZnO at 300° C.; and $MgCO_3$ decomposes at 325° C. and loses remaining $CO_2$ at 900° C. ($MgCO_3$ does not melt). When the compressible material contains $MgCO_3$, and the processing temperature exceeds 900° C., for instance, the magnesium carbonate decomposes to $CO_2$ (which evolves away) and MgO, which reduces the thickness of the coating. The remaining MgO may be removed with an acid. Alternatively, the MgO may remain as a compressed material in the final ceramic matrix composite—in which case the MgO is a beneficial ceramic layer.

Alternatively, or additionally, compressibility may arise from melting at elevated temperature, such as in the case of a metal. For example, zinc melts at 419.5° C., magnesium melts at 650° C., nickel melts at 1085° C., and silicon melts at 1414° C. When the compressible material contains Mg, and the processing temperature exceeds 650° C., the magnesium metal melts, which may reduce the thickness of the solid phase of the coating. The compressible coating may be tailored to include single metals or multiple metals in order to be compressive at desired temperatures.

The compressed coating may be designed to be inert or active. In some embodiments, the coating is inert and does not react with the environment or change chemical composition or phase after the reinforcement process to fabricate the ceramic matrix composite. In other embodiments, the coating is active and may change chemical composition or phase via reactions with the ceramic matrix, with the reinforcement material, and/or with the environment. As one example, $B_2O_3$ may react with polyurea to generate BN at 900° C.

The stiffness of the compressible coating is preferably significantly less than the stiffness of the reinforcement material. The compressible coating preferably has a stiffness, normal to the coating thickness, that is less than 20% of the stiffness of the reinforcement material. More preferably, the compressible coating has a stiffness, normal to the coating thickness, that is less than 10% of the stiffness of the reinforcement material. Most preferably, the compressible coating has a stiffness, normal to the coating thickness, that is less than 5% of the stiffness of the reinforcement material. For example, the stiffness of the compressible coating may be from about 1% to about 10% of the stiffness of the reinforcement material.

The compressible coating may be a fully dense film (porosity less than 5 vol %). More preferably, the compressible coating is a porous film with a porosity of at least 5 vol %. The porosity may range from about 5 vol % to about 90 vol %, such as from about 30 vol % to about 70 vol %, for example. The porosity may be stochastic or structured, such as via a repeating pattern. In a porous film, the size of pores may be uniform or they may have a distribution in shape and size. Pore shape may be isotropic, approximated by a sphere. In some embodiments, the pore shape is anisotropic prior to compression of the coating. The coating may preferentially compress through the thickness of the coating, or may preferentially compress in directions orthogonal to the thickness, for example.

The porosity may be closed porosity or open porosity, with respect to the outer surface of the compressible coating (facing the matrix). In some embodiments, there is closed porosity or there is open porosity but with hydraulic pore diameter sufficiently small to cause a high capillary pressure, thereby preventing ingress of pre-ceramic or ceramic matrix material. In other embodiments, ingress of material during ceramic densification is desired, to assist in compression of the compressible coating. The hydraulic dynamic is preferably sufficiently small to prevent ingress in processing before ceramic densification.

The porous coating may be fabricated with the aid of space holders, which are materials that enable open space to be created and to persist in a material. In some embodiments, a porous coating is formed using packing space holders. In some embodiments, a porous coating is formed by combustion of space holders. In these or other embodiments, a porous coating is formed by thermal degradation and/or thermal phase transformation of space holders. In these or other embodiments, a porous coating is formed by chemical etching of space holders, such as through reaction with an acid, a base, or by chemical dissolution. In some embodiments, a high concentration (e.g., above 74 vol %) of space holders is employed to create additional holes and surface porosity. If the space holders are deposited as a fluid that solidifies—such as a high-internal-phase emulsion of polymer monomers—multiple openings between pores will be created where the space holder droplets touch.

Controlled or targeted etching of the compressible material may be utilized, to create porosity at the surface.

The porous coating may be fabricated to contain hierarchical porosity. Hierarchical porosity, including smaller pores in walls to increase the volume fraction of voids and the total porosity, may be achieved by dealloying of the wall material, as described in Erlebacher et al., "Evolution of nanoporosity in dealloying" *Nature* Vol. 410, 450 (2001), which is hereby incorporated by reference.

A porous compressible coating may be formed from the agglomeration, arrangement, or self-packing of nanoparticles. In some embodiments, nanoparticles have a mean diameter of 0.01% to 10% relative to the average thinnest dimension of the reinforcing elements. Attaching nanoparticles on the reinforcing elements may be accomplished via surface treatment, for example. The nanoparticles may have a mean diameter selected from about 1 nanometer to about 5000 nanometers, such as from about 5 nanometers to about 1000 nanometers, or from about 10 nanometers to about 500 nanometers, for example.

Particle sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images. Finally, sieving is a conventional technique of separating particles by size.

The compressible coating may have a thickness less than or equal to the average thickness (thinnest dimension) of the reinforcing elements. Preferably, the thickness of the compressible coating is less than half the average thickness of the reinforcing elements, and more preferably less than a tenth of the average thickness of the reinforcing elements. The optimal thickness of the reinforcing elements is generally determined by the compressibility of the coating, the extent of ceramic matrix shrink during densification, and the critical energy release rate of the ceramic matrix during densification. The latter is generally unknown.

In various embodiments, the thickness of the compressible coating is selected from about 0.1 micron to about 1000 microns, such as from about 0.5 microns to about 500 microns, or from about 1 micron to about 100 microns. In various embodiments, the average thickness of the compressible coating is about, at least about, or at most about 0.1, 0.2, 0.5, 1, 2, 3, 4, 5, 10, 15, 20, 25, 30, 40, 50, 60, 70, 80, 90, 100, 125, 150, 200, 250, 300, 400, 500, 600, 700, 800, 900, or 1000 microns, including any intervening ranges. The coating thickness may be uniform or may have stochastic variations. In certain embodiments, the coating thickness is non-uniform such that the coating is thicker in certain portions, e.g. thicker on the broad sides of the reinforcing elements than on the narrow ends, or vice versa.

The ceramic material in the ceramic matrix may vary widely and may, for example, be an oxide, a carbide, a nitride, or a combination thereof. Examples of ceramic materials include, but are by no means limited to, SiC, $Si_3N_4$, $SiO_2$, SiOC, SiOCN, SiON, SiTiCO, SiAlCO, SiBCN, BN, SiAlON, $B_4C$, $Al_2O_3$, AlON, $SiO_2$, $TiO_2$, $GeO_2$, $ZrO_2$, mullite, and combinations thereof.

Various methods of making a pre-ceramic matrix composite and converting it to a ceramic matrix composite will now be described, without limitation.

Some variations of the invention provide a method to make a ceramic matrix composite, the method comprising:
 (a) providing a precursor matrix comprising a pre-ceramic material;
 (b) providing one or more reinforcing elements, wherein the one or more reinforcing elements each contain a reinforcement material;
 (c) coating a compressible material on the surface of the one or more reinforcing elements, to generate one or more coated reinforcing elements;
 (d) disposing the one or more coated reinforcing elements within the precursor matrix, thereby generating a pre-ceramic matrix composite;
 (e) thermally treating the pre-ceramic matrix composite to convert the pre-ceramic material into a ceramic material with associated densification, wherein the compressible material converts to a compressed material to absorb strain energy associated with the densification, thereby generating a ceramic matrix composite containing a matrix comprising the ceramic material and the one or more reinforcing elements coated with the compressed material; and
 (f) recovering the ceramic matrix composite.

In some methods, step (e) employs pyrolysis of a pre-ceramic polymer into a ceramic material. In some methods, step (e) employs sintering. In some methods, step (e) employs sol-gel processing.

Figure 5:
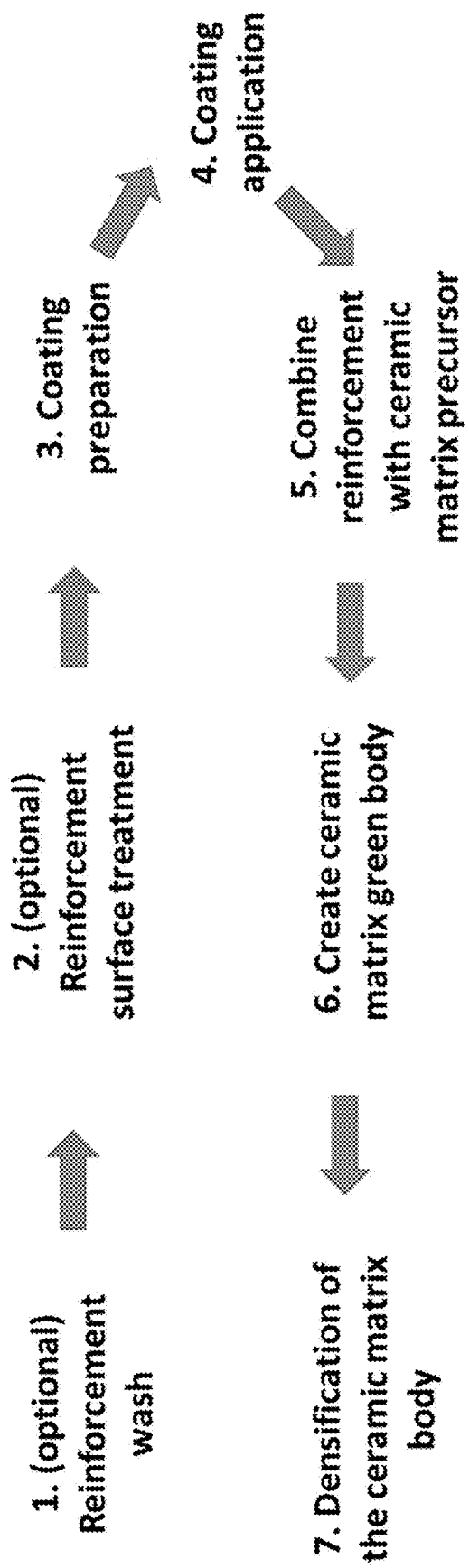
FIG. 5 shows an exemplary method flowchart for fabricating a ceramic matrix composite, using reinforcements having a compressible coating.

FIG. 5 shows an exemplary method flowchart for fabricating a ceramic matrix composite, using reinforcements having a compressible coating. Each of the steps will now be further described.

Before coating the reinforcing elements with a compressible coating, the reinforcing elements may be washed. For example, the reinforcing elements may be cleaned and degreased using a detergent, a soap, and/or sodium hydroxide. Grease removal may be conducted using a solvent bath, with a solvent such as a ketone. Oxides may be removed from metallic reinforcing elements. For example, when the reinforcing elements contain iron, iron oxides may be removed chemically by reducing the iron oxides with carbon, carbon monoxide, or hydrogen. Metal oxides may also be removed by reacting with an acid. Or, electrochemical reactions may be utilized to convert metal oxides to metals. Tumbling may be employed to break off bonded impurities and to break apart agglomerated reinforcing elements.

Optionally, the reinforcing elements are surface-modified or surface-treated. For example, a vacuum deposition technique of a conductive seed layer may be applied to the surface of the reinforcing elements, for subsequent electroplating. Surface modification for promoting bonding with the compressible material may include plasma treatment and/or chemical treatment.

The reinforcing elements are coated with a compressible material using one or more techniques. In some embodiments, chemical vapor deposition of a polymer (e.g., parylene or polysilanes), a metal (e.g., zinc), or another compound (e.g., boron nitride) is performed. In some embodiments, the reinforcing elements are dipped into a solvent bath with dissolved monomers, oligomers, and/or polymers to uniformly coat the reinforcing elements with the selected compressible materials or precursors thereof.

In some embodiments, the compressible material is a polymer with a significant mass loss (such as greater than 50% or even greater than 90%) during later densification, to provide high compressibility during densification of the ceramic matrix. Preferably, the shrinkage and mass loss occurs at a temperature below the peak densification temperature for the ceramic matrix.

In some embodiments, the compressible coating is a polymer and the coated reinforcing elements are pyrolyzed or thermally decomposed to convert the polymer to a ceramic or carbonaceous material. This optional step is prior to integration within the ceramic matrix.

Some embodiments employ electroplating or electroless plating a metallic film onto the surface of the reinforcing elements. A non-contiguous seed layer may be utilized to produce a porous structure. An exemplary seed layer is a layer of gold and titanium, such as a sub-layer or titanium adjacent to a sub-layer of gold.

In some embodiments, sol-gel processing is utilized to coat the reinforcing elements. Controlled porous structures may be generated through zeolite formation or aerogel formation, for example.

Another method step involves combining coated reinforcing elements in a precursor matrix using dispersion, mixing, tumbling, infiltrating, or a combination thereof, for example. For thermal-decomposition processing, coated reinforcing elements may be dispersed into a pre-ceramic polymer. Alternatively, or additionally, a pre-ceramic polymer may be infiltrated into a coated reinforcement scaffolding. For sol-gel processing, coated reinforcing elements may be dispersed into a colloidal solution. For sintering, coated reinforcing elements may be mixed with ceramic matrix particles and an organic binder (e.g. acrylate), for example. This step creates a pre-ceramic matrix composite.

Another optional method step involves creation of a ceramic matrix green body. In embodiments using pre-ceramic polymers, this step may employ stereolithography, digital light projection, or other types of additive manufacturing; casting, freeze casting, or tape casting; coating such as spraying, dip-coating, or spin-coating; injection molding; extrusion or micro-extrusion; ink jetting; UV/X-ray lithography; or a combination thereof, for example. In embodiments using sol-gel processing, this step may employ coating, extrusion, casting, spraying, injection molding, spinning, or a combination thereof, for example. In embodiments using sintering, this step may create a sintered body by pressing a mixture of the coating reinforcing elements and a ceramic aggregate, binding the mixture with a polymer network, and then additively manufacturing by binder jetting, polyjetting, fused deposition modeling, extrusion, or a combination thereof, for example. Optionally, the green body is machined and/or joined. The ceramic matrix green body may be regarded as another version of a pre-ceramic matrix composite, or as an intermediate composite between pre-ceramic matrix composite and the ceramic matrix composite.

The compositions disclosed herein may be additively manufactured (3D-printed) using many different methods.

Typically, a pre-ceramic composition is conveyed (printed) to a region of interest, such as via stereolithography, binder jetting, resin jetting with fiber placement, polyjetting, or extrusion printing, either followed by polymerization or with polymerization taking place simultaneously with the printing. Preferably, the polymerizing and 3D printing steps are performed simultaneously, at a desired location (e.g., a layer) within a body. In some embodiments, the polymerizing and 3D printing steps are performed semi-simultaneously, in which multiple steps are performed overall while at each step, some amount of polymerizing and some amount of 3D printing takes place.

In stereolithography, layers of resin composition are cured from the top or bottom using UV-laser rastering, projection micro-stereolithography, digital light projection, or liquid crystal device projection, for example. Smaller filler sizes are preferred since the filler size often limits the resolution, depending on material choice.

Generally speaking, "jetting" of a material means that droplets of a build material are selectively deposited onto a build bed to develop a three-dimensional object. Jetting can be carried out by liquid deposition, vapor deposition, or liquid-vapor mist deposition, for example, via spraying (such as via a nozzle in communication with a material under pressure), impingement (such as via a tube or pipe in communication with a material that is pumped), or other means.

In binder jetting, a layer of liquid resin is jetted on selected locations and cured such as via UV light or thermally. This process is similar to conventional binder jetting methods, but instead of a binder, a pre-ceramic composition is used. An optional solid filler may initially be spread out on a substrate or on a region of polymer based on the selected monomer, if desired. After an initial step of binder jetting, another layer is generated via resin jetting and curing. This process may be repeated many times for large objects.

In resin jetting with fiber placement, solid fillers in the form of long or short fibers are placed in the preferred location and aligned in the preferred direction. Subsequently, liquid resin is jetted in selected locations and cured. The process is repeated layer-by-layer to build a part. Resin jetting with fiber placement enables printing of parts with high volume fraction (such as 30-60 vol %) of aligned fibers, resulting in improved mechanical properties for the final ceramic structure (following pyrolysis).

In polyjetting, a mixture of liquid resin (and optionally solid fillers) is jetted and written into the desired pattern. As the mixture is dispensed, it is exposed to UV light such as a laser, LED, or plasma sources, and cured into a polymer. Multiple mixtures are able to be dispensed through different nozzles, allowing for more than one composition to be utilized simultaneously. This results in tailored mechanical properties for the final ceramic structure (following pyrolysis).

In extrusion printing, the liquid resin is squeezed through a micro-nozzle, or multiple micro-nozzles, and cured via UV light. One advantage is that high-aspect-ratio fillers can be aligned with the extrusion process. Alignment generally improves mechanical properties in the aligned direction.

Creation of the ceramic matrix composite finally occurs via densification of the pre-ceramic matrix body or the green body if that had been produced as an intermediate step.

In preferred embodiments, the densification does not require external pressurization of greater than atmospheric pressure. In other embodiments, the densification utilizes elevated pressures, such as in hot-isostatic processing, hot pressing, spark plasma sintering, field-assisted sintering technique, or pulsed electric current sintering, for example.

In embodiments using thermal decomposition (pyrolysis), the pre-ceramic matrix body or the green body may be subjected to an elevated temperature over a period of time. The maximum pyrolysis temperature may be from about 600° C. to about 1200° C., or from about 800° C. to about 1100° C. The ambient environment may be controlled during pyrolysis, such as by using an inert gas—preferably Ar or $N_2$. Alternatively, reactive gases may be employed, such as (but not limited to) $O_2$ to promote oxide formation, $NH_3$ to promote nitride formation, or $H_2$ to reduce metal oxides to metals.

In some embodiments, densification employs a sol-gel process. Monomers may be polymerized into a colloidal solution (sol) followed by high-temperature heat treatment to densify and form a ceramic material. Prior to densification, the sol may first from a xerogel film, or a wet gel followed by evaporation, for example.

In some embodiments, densification employs a sintering process. The pre-ceramic matrix body or the green body may be subjected to an elevated temperature, which depends on the choice of materials. For example, 1400-1700° C. is a typical sintering temperature range for $Al_2O_3$. An inert cover gas such as Ar may be used, or oxygen may be employed to promote oxide formation if desired. In certain embodiments, the temperature ramp rate is controlled to optimize sintering.

The extent of shrinkage of the matrix during densification may be about, or at least about, 5 vol %, 10 vol %, 15 vol %, 20 vol %, 25 vol %, 30 vol %, 35 vol %, 40 vol %, 45 vol %, or 50 vol %, including all intervening ranges.

Densification employing pyrolysis, sintering, or sol-gel processing commonly include thermal treatment at varying severity. Typically, the thermal treatment is based on heating the pre-ceramic structure for an extended period of time (such as from 10 minutes to 1 week) under various inert or reactive atmospheres.

Thermal treatment may be done for an extended period of time under various inert or reactive atmospheres, including but not limited to $N_2$, Ar, He, air, $CO_2$, CO, $H_2$, $CH_4$, $C_2H_6$, $C_2H_4$, $NH_3$, or a combination thereof. Treatment pressures may vary from about 1 atm to about 20 atm, for example. Vacuum pyrolysis may also be employed, in which the treatment pressure is less than 1 atm, again under various atmospheres as noted above.

The pyrolysis or other thermal treatment may include heating at a heating rate of 0.1-20° C./min from ambient temperature to an elevated temperature from about 500° C. to about 2000° C., such as from about 800° C. to about 1100° C. Slow heating rates are preferred to enable evolving gases to escape, thereby minimizing porosity in the final part. When porosity is desired, higher heating rates (e.g., higher than 20° C./min) may be employed. The pyrolysis or other thermal treatment may also include dwelling at the elevated temperature (e.g., 950° C.) for at least 1, 5, 10, 15, 30, or 60 minutes, for example. Following thermal treatment, the material may be cooled at a cooling rate (magnitude) of 0.1-20° C./min back to ambient temperature. In some embodiments, faster cooling (e.g., higher than 20° C./min in magnitude) is desired to freeze-in a desired microstructure, for example.

In some embodiments, a reactive thermal treatment is performed, in which a gas is reactive toward the initial pre-ceramic material, the final ceramic material, or both of these. When the gas is reactive, it may react with a component and cause it to leave the material. Alternatively, or additionally, the gas may react with a component and remain with the base material. It is also possible for the gas to react and form products, some of which depart from the material while the rest remains with the material. Reactive gases may be selected from $O_2$, air, $O_3$, CO, $CO_2$, $H_2$, $H_2O$, $CH_4$, $SO_2$, $H_2S$, $NH_3$, NO, $NO_2$, and $N_2O$, and so on. The maximum temperature for reactive thermal treatment may be, for example, about 300° C. to about 2000° C. The system pressure may also be adjusted to influence the gas atmosphere.

During the thermal treatment, whether an inert or reactive thermal treatment technique is employed, gases usually escape. For example, gases are formed during the conversion of pre-ceramic polymer to a ceramic structure, by decomposition reactions of the polymer and other materials present. The escaping gases or vapors may include (but are by no means limited to) $CH_4$, $H_2$, CO, $CO_2$, $H_2O$, $SO_2$, $H_2S$, $CH_3S$, etc.

The final ceramic structure (ceramic matrix composite) may be characterized by an actual density that is at least 50% of theoretical density, preferably at least 75% of theoretical density, and more preferably at least 95% of theoretical density. By "theoretical density" it is meant the density of the material itself, calculated in the absence of porous voids. For example a ceramic structure with absolute density of 2.0 $g/cm^3$, fabricated from a base material with inherent (bulk) density of 2.1 $g/cm^3$, exhibits 2.0/2.1=95% of theoretical density. In certain embodiments, without limitation, the ceramic structure is a fully dense monolith, which means that the ceramic structure has at least 99% (e.g., essentially 100%) of theoretical density associated with a part or continuous region of material. The absolute density in $g/cm^3$ will vary, depending on the selection of base materials; an exemplary range is about 1 $g/cm^3$ to about 5 $g/cm^3$.

The strength of the ceramic matrix composite will vary, depending on the initial pre-ceramic composition, as well as the processing parameters. In some embodiments, the final ceramic material is characterized by a Young's Modulus of at least about 100 GPa, 200 GPa, 300 GPa, 400 GPa, 500 GPa, or more, measured at 25° C. In some embodiments, the final ceramic material is characterized by a flexural strength of at least about 300 GPa, 400 GPa, 500 GPa, or more, measured at 25° C. In some embodiments, the ceramic matrix composite is characterized by a hardness of at least about 10 GPa, 20 GPa, 30 GPa, or more, measured at 25° C.

The thermal stability of the ceramic matrix composite will vary, depending primarily on the composition as well as the processing parameters. In various embodiments, the ceramic matrix composite is thermally stable at a temperature of at least 1500° C., 1600° C., 1700° C., 1800° C., 1900° C., or 2000° C. Thermal stability means at least that the ceramic material does melt at these temperatures, and preferably also that the ceramic material does not react (e.g., by oxidation or reduction), undergo thermal shock, or physically decompose (introducing defects) at these temperatures. In some embodiments, for example, the ceramic structure is characterized by being stable in the presence of air at a temperature of about 1000° C., 1100° C., 1200° C., 1300° C., 1400° C., 1500° C., 1600° C., 1700° C., 1800° C., or higher.

The ceramic matrix composite, even when no machining, polishing, bonding, surface finishing, or assembly is required, may be subjected to coloring (e.g., with inks or dyes), stamping, or other non-functional features, if desired.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A ceramic matrix composite comprising:
 (a) a matrix comprising a ceramic material;
 (b) one or more reinforcing elements disposed within said matrix, wherein said one or more reinforcing elements each contain a reinforcement material, and wherein said reinforcement material is characterized by a Young's modulus of at least 20 GPa; and
 (c) a compressed material disposed on a surface of said one or more reinforcing elements and interposed between said one or more reinforcing elements and said matrix, wherein said compressed material forms a discontinuous coating and/or a surface-patterned coating on said surface of said one or more reinforcing elements,
 wherein said compressed material is selected from the group consisting of pyrolyzed polyethylene, pyrolyzed polypropylene, pyrolyzed parylene, pyrolyzed polystyrene, pyrolyzed polycarbosilane, pyrolyzed polycarbosiloxane, pyrolyzed polycarbosilazane, Ni, Ni—Fe alloys, Cu, Au, Ag, Cr, Zn, Sn, non-amorphous $SiO_2$, SiOC, SiOCN, SiON, SiTiCO, SiAlCO, SiBCN, SiAlON, $Ti_3AlC_2$, $Ti_2AlC$, $Ti_4AlN_3$, $Ti_3GaC_2$, $Ti_3SnC_2$, $B_2O_3$, carbon, and combinations thereof,
 wherein said compressed material has a porosity from 0% to about 90%,
 and wherein said compressed material has a thickness less than or equal to an average thickness of said one or more reinforcing elements.

2. The ceramic matrix composite of claim 1, wherein said ceramic material is an oxide, a carbide, a nitride, or a combination thereof.

3. The ceramic matrix composite of claim 1, wherein said ceramic material is selected from the group consisting of SiC, $Si_3N_4$, $SiO_2$, SiOC, SiOCN, SiON, SiTiCO, SiAlCO, SiBCN, BN, SiAlON, $B_4C$, $Al_2O_3$, mullite, AlON, $SiO_2$, $TiO_2$, $GeO_2$, $ZrO_2$, and combinations thereof.

4. The ceramic matrix composite of claim 1, wherein said one or more reinforcing elements have an average maximum dimension of about 5 microns to about 1 millimeter and an average length-to-thickness aspect ratio of about 1 to about 50.

5. The ceramic matrix composite of claim 1, wherein said one or more reinforcing elements are in the form of particles, platelets, short fibers, long fibers, whiskers, hollow spheres, spheres with at least 98% of theoretical density of said reinforcement material, or a combination thereof.

6. The ceramic matrix composite of claim 1, wherein said reinforcement material is present in a volume fraction from about 5% to about 60% based on a total volume of said ceramic matrix composite.

7. The ceramic matrix composite of claim 1, wherein said reinforcement material is selected from the group consisting of SiC, $Si_3N_4$, SiOC, SiOCN, SiON, $B_4C$, ZrC, HfC, TiC, WC, TiN, HfN, ZrN, AlON, $Al_2O_3$, $SiO_2$, $Al_2O_3$—$SiO_2$ silicates, $TiO_2$, CaO, $GeO_2$, $ZrO_2$, $Y_2O_3$, $ZrB_2$, $TiB_2$, $ZrB_2$, $HfB_2$, $VB_2$, $NbB_2$, TaB, $TaB_2$, Ti, Zr, Ni, Al, W, Nb, Cr, Ta, Cu, Fe, Co, Y, and combinations or alloys thereof.

8. The ceramic matrix composite of claim 1, wherein said porosity is from about 5% to about 50%.

9. The ceramic matrix composite of claim 1, wherein said compressed material is a compressed form of a compressible material that has a stiffness that is less than 20% of the stiffness of said reinforcement material.

10. A ceramic matrix composite comprising:
(a) a matrix comprising a ceramic material;
(b) one or more reinforcing elements disposed within said matrix, wherein said one or more reinforcing elements each contain a reinforcement material; and
(c) a compressed material disposed on a surface of said one or more reinforcing elements and interposed between said one or more reinforcing elements and said matrix,
wherein said compressed material is selected from the group consisting of pyrolyzed thermoset polymers, pyrolyzed thermoplastic polymers, metals, ceramic materials, carbon, pyrolyzed phenolic polymers, and combinations thereof,
wherein said compressed material has a porosity from 0% to about 90%,
wherein said compressed material has a thickness less than or equal to an average thickness of said one or more reinforcing elements,
and wherein said compressed material forms a discontinuous coating on said surface of said one or more reinforcing elements.

11. A ceramic matrix composite comprising:
(a) a matrix comprising a ceramic material;
(b) one or more reinforcing elements disposed within said matrix, wherein said one or more reinforcing elements each contain a reinforcement material; and
(c) a compressed material disposed on a surface of said one or more reinforcing elements and interposed between said one or more reinforcing elements and said matrix,
wherein said compressed material is selected from the group consisting of pyrolyzed thermoset polymers, pyrolyzed thermoplastic polymers, metals, ceramic materials, carbon, pyrolyzed phenolic polymers, and combinations thereof,
wherein said compressed material has a porosity from 0% to about 90%,
wherein said compressed material has a thickness less than or equal to an average thickness of said one or more reinforcing elements,
and wherein said compressed material forms a surface-patterned coating on said surface of said one or more reinforcing elements.

* * * * *